United States Patent
Inselberg (10) Patent No.: US 6,760,595 B2
(45) Date of Patent: *Jul. 6, 2004

(54) METHOD AND APPARATUS FOR INTERACTIVE AUDIENCE PARTICIPATION AT A LIVE SPECTATOR EVENT

(76) Inventor: Eric Inselberg, P.O. Box 833, Short Hills, NJ (US) 07078

( * ) Notice: Subject to any disclaimer, the term of this patent is extended or adjusted under 35 U.S.C. 154(b) by 0 days.

This patent is subject to a terminal disclaimer.

(21) Appl. No.: 10/378,582

(22) Filed: Mar. 5, 2003

(65) Prior Publication Data

US 2003/0144017 A1 Jul. 31, 2003

Related U.S. Application Data

(63) Continuation-in-part of application No. 09/854,267, filed on May 11, 2001, which is a continuation of application No. 09/656,096, filed on Sep. 6, 2000, now Pat. No. 6,434,398.

(51) Int. Cl.[7] ................................................. H04Q 7/20
(52) U.S. Cl. ....................... 455/517; 455/575.6; 463/36; 463/39; 463/40
(58) Field of Search ................................ 455/517, 550, 455/414, 575; 463/36–42; 725/9

(56) References Cited

U.S. PATENT DOCUMENTS

| | | | |
|---|---|---|---|
| 4,141,548 A | 2/1979 | Everton ...................... 273/1 E |
| 4,496,148 A | 1/1985 | Morstain et al. ............ 273/1 E |
| 4,722,526 A | 2/1988 | Tovar et al. ................. 273/1 E |
| 5,213,337 A | 5/1993 | Sherman ...................... 273/439 |
| 5,226,177 A | 7/1993 | Nickerson ...................... 455/2 |
| 5,273,437 A | 12/1993 | Caldwell et al. ............. 434/351 |
| 5,526,035 A | 6/1996 | Lappington et al. .......... 348/13 |
| RE35,449 E | 2/1997 | Derks ......................... 395/800 |
| 5,724,357 A | 3/1998 | Derks ......................... 370/413 |
| 5,801,754 A * | 9/1998 | Ruybal et al. ................ 725/65 |
| 5,860,862 A | 1/1999 | Junkin ......................... 463/40 |
| 5,916,024 A | 6/1999 | Von Kohorn ................ 463/40 |
| 5,946,635 A | 8/1999 | Dominguez ................. 455/558 |
| 5,993,314 A | 11/1999 | Dannenberg et al. .......... 463/1 |
| 6,080,063 A | 6/2000 | Khosla ........................ 463/42 |
| 6,193,610 B1 | 2/2001 | Junkin ......................... 463/40 |
| 6,293,868 B1 | 9/2001 | Bernard ....................... 463/42 |
| 6,434,398 B1 * | 8/2002 | Inselberg ..................... 455/517 |
| 2002/0029381 A1 | 3/2002 | Inselberg ....................... 725/9 |
| 2002/0115454 A1 | 8/2002 | Hardacker ................. 455/457 |
| 2002/0119823 A1 | 8/2002 | Beuscher ..................... 463/42 |
| 2002/0199198 A1 | 12/2002 | Stonedahl .................... 725/86 |

OTHER PUBLICATIONS http://www.meridia–interactive.com: Meridia Audience Response Systems.
http://www.replysystems.com: Wireless Audience Respone and Voting Systems.
http://www.presentationtesting.com: Presentation Testing, Inc.

* cited by examiner

Primary Examiner—Jean Gelin
(74) Attorney, Agent, or Firm—Ernest D. Buff & Associates, LLC; Ernest D. Buff; Gordon E. Fish (57) ABSTRACT

A method for providing interactive audience participation at live spectator events enhances enjoyment for a plurality of spectators. Participating spectators employ wireless interactive devices that present a promotional message and include user input and output interfaces. Spectators are queried, and enter answers via the user input interface. The answers are transmitted to a central processor, stored as spectator data, and processed into results. A visual display or the user output interface announces the results to the spectators.

52 Claims, 3 Drawing Sheets

METHOD AND APPARATUS FOR INTERACTIVE AUDIENCE PARTICIPATION AT A LIVE SPECTATOR EVENT

RELATED U.S. APPLICATION DATA

This application is a continuation-in-part of co-pending U.S. patent application Ser. No. 09/854,267, filed May 11, 2001 which, in turn, is a continuation of U.S. patent application Ser. No. 09/656,096, filed Sep. 6, 2000, now U.S. Pat. No. 6,434,398, issued Aug. 13, 2002.

BACKGROUND OF THE INVENTION

1. Field of the Invention

The present invention relates to a system and method for interactive audience participation at a live spectator event; and more particularly, to a system and method by which spectators answer queries using wireless interactive devices, the answers are correlated and results are announced, thereby enhancing the spectators' experience and enjoyment.

2. Description of the Prior Art

Spectator events and, in particular, spectator sporting events have become a multibillion dollar a year business throughout the world. Millions of people attend their favorite sporting events, choosing among baseball, soccer, basketball, hockey, football, tennis, golf, auto racing, horse racing, boxing, and many others. Rather than merely watching sporting events on television, fans are willing to pay for the privilege of attending such events live in order to enjoy the spontaneity and excitement.

Audience reaction at live spectator events is generally gauged informally on crowd volume. At certain events, limited amounts of information are shared with audience members using large screen displays such as those available from Sony Corporation under the trademark JUMBOTRON®. However, the opportunities for audience participation and useful or meaningful audience feedback are limited.

Marketing research has shown that audience members desire both an opportunity to participate in the spectator event and enjoy interactivity with other audience members. Informed audience members desire an opportunity to share their opinions with others. Heretofore, there has been no practical means to solicit the aggregate positions and the opinions of audience members at large venues (e.g., stadiums, arenas, race tracks, golf courses, theme parks, and other expansive outdoor/indoor venues).

Fans at live spectator events have come to expect background information and detailed analysis from viewing televised sporting events at home and/or readily obtaining such information over the Internet. Further, audience members are becoming more and more accustomed to interactivity from their use of computer games, such as fantasy sports league games, that allow them to organize teams, determine game strategies and test their skill at managing a sports team. Accordingly, in order to continue attracting live audiences to attend these large venues, promoters have an incentive to provide audience members with an enhanced experience.

One example of a venue that would benefit from enhanced audience participation is major league baseball. The games last several hours, and audience members ordinarily spend most of their time in and around a reserved seat. When going to the concession stand or restrooms, the fan misses part of the game. Further, opportunities for interaction and expressing one's opinion are typically limited to cheering or jeering. Occasionally, a single fan or a few fans are selected to participate in a contest, such as a trivia contest, but these opportunities are extremely limited. Nearly every fan has an opinion about how the game should be played, and would like an opportunity to express his or her opinion. Ideally, fans would like to be recognized for their skill and knowledge concerning individual teams and/or winning strategies. Fans also desire to express opinions concerning facilities, sponsors, players, management and concessions. Being able to voice an opinion, and comparing the opinion to that of other fans, would enhance the overall experience. Also, this kind of information can be useful to management by helping it determine the kind of services that fans desire.

Additionally, an often-heard complaint from fans is that they missed some of the action because they could not see or did not know precisely what was happening. For example, sometimes the seat location of the attendee fails to offer an unobstructed view. On other occasions a technical ruling may be made by a game official that is not fully explained to those in attendance but is fully analyzed by television and/or radio announcers.

It is also noted that spectators commuting to and/or from events do not have ready access to desirable information such as sports related information and other information such as traffic and weather reports.

Accordingly, there remains a need for a method and system that provides interaction that heightens the enjoyment experienced by participants at a live spectator event.

SUMMARY OF THE INVENTION

The present invention relates to a method and apparatus for enhancing the experience of audience members at live spectator events by more fully involving the audience. In a preferred embodiment of the invention, there is provided a method for enhancing interactive participation by a plurality of spectators attending a live spectator event. The method comprises communicating information and queries to participants at the event, such as a sporting event, using a wireless interactive device in conjunction with a wireless communications system. The device permits fans to respond to displayed messages or to participate in contests of various sorts. Individual fan feedback is received and transferred to a central processor for storage and processing (e.g., tabulation or statistical analysis). Thereafter, the results are announced to the individual fan or to the audience as a whole. The interactive device is preferably a wireless, hand held device, having user input and output interfaces. The user input interface preferably comprises at least one member selected from the group consisting of a keypad, selection buttons, a touch screen, a rotatable dial, a pointing device (e.g. a mouse or trackball), and a voice recognition system. The user output interface preferably comprises a visible display for alphanumeric, textual, or graphic images and audio output means such as a speaker or earphone. Preferably the device is a cellular telephone, two-way pager, or wireless personal digital assistant (PDA) or pocket PC. It is further preferred that the device be Internet enabled, and that the wireless communication system employ the Internet in the communication of data. Alternatively, the interactive device may be a special-purpose device incorporating at least features needed for the practice of the present method.

The device is easily transported, permitting the fan to carry it on trips to the concession stands or to the restrooms. Further, the method presents promotional messages of sponsors and advertisers to each user of the interactive device.

The promotional message may be permanently affixed to the device and/or transmitted to each device via open band lines.

The method can be used to conduct contests wherein a fan is asked to predict the next event or events to take place (e.g. the outcome of the next at bat in a baseball game or the next play or plays to be called in a football game on a real time basis, all star balloting, pitching changes, etc.). Using simple input devices, such as arrow keys and an enter key, a touch screen display or a numeric keypad, the fan selects from a list of promptings and/or possible answers. A fan who correctly predicts a predetermined number of outcomes may be awarded an electronic coupon that can be redeemed for concessions and/or other prizes. Alternatively, the prize could be delivered to the fan based on the location of the fan's interactive device by means of communication with the transceiver located therein.

The degree of attention and receptivity accorded to promotional messages and advertisements received by patrons using an interactive device at a live spectator event in accordance with the present method is beneficially increased. The combination of the atmosphere of the live venue with the interactive content and the stimulus of active participation frequently heightens the degree of interest of spectators at a live event for proffered advertisements over that accorded by those who passively view or hear broadcast coverage at home or another remote location. The spontaneity and excitement engendered at the actual event enhance the likelihood that a fan will perceive advertised items favorably. A fan at the live event is also more likely to respond positively by purchasing food and beverage items, souvenirs, team promotional merchandise, and the like.

In a further aspect the method makes it possible to receive instantaneous and correlated feedback from a large number of motivated patrons. Their comments, directed both to advertised products and services and to the entertainment itself, are valuable information for sponsors, teams, leagues, and providers of goods and services, for example.

In yet another aspect of the invention, play-by-play and expert commentary are wirelessly transmitted to the interactive device during the live event for output to the user. The transmitted content optionally includes other desirable informational items such as news, traffic, weather conditions and forecasts, news and scores of other sporting events. The availability of such material increases fans' enjoyment and the perceived value of attending a live sporting event.

The method and system of the invention are advantageously practiced at a live spectator event, by which is meant an organized event wherein a large number of patrons are gathered to witness and enjoy in real time any form of entertainment, including an event such as an artistic or athletic performance or an important business, civic or religious event. Such events may be conducted at permanent facilities, such as indoor and outdoor stadiums for sporting events and other public gatherings; amphitheaters; auditoriums; concert halls and theaters; race tracks for animals or vehicles; theme parks; convention centers; casinos; exhibition halls; or other similar venues associated with organized gatherings of large numbers of people. Live spectator events can also be held at facilities that are temporary and not ordinarily appointed for large gatherings, such as golf courses or temporary urban road racing courses. It is contemplated that the present method may be carried out at events of the aforementioned or similar types.

In another aspect, the method and system of the invention are advantageously practiced at live events which entail simultaneously-occurring activities in different locations within an overall venue, such as golf and tennis tournaments, the Olympic Games, and the like. The wireless interactive device of the invention allows spectators viewing one of the activities to remain apprised of the progress of other activities.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

For the purpose of illustrating the invention, there is shown in the accompanying drawings a form which is presently preferred; it being understood that the invention is not intended to be limited to the precise arrangements and instrumentalities shown.

DETAILED DESCRIPTION OF THE INVENTION

Figure 1:
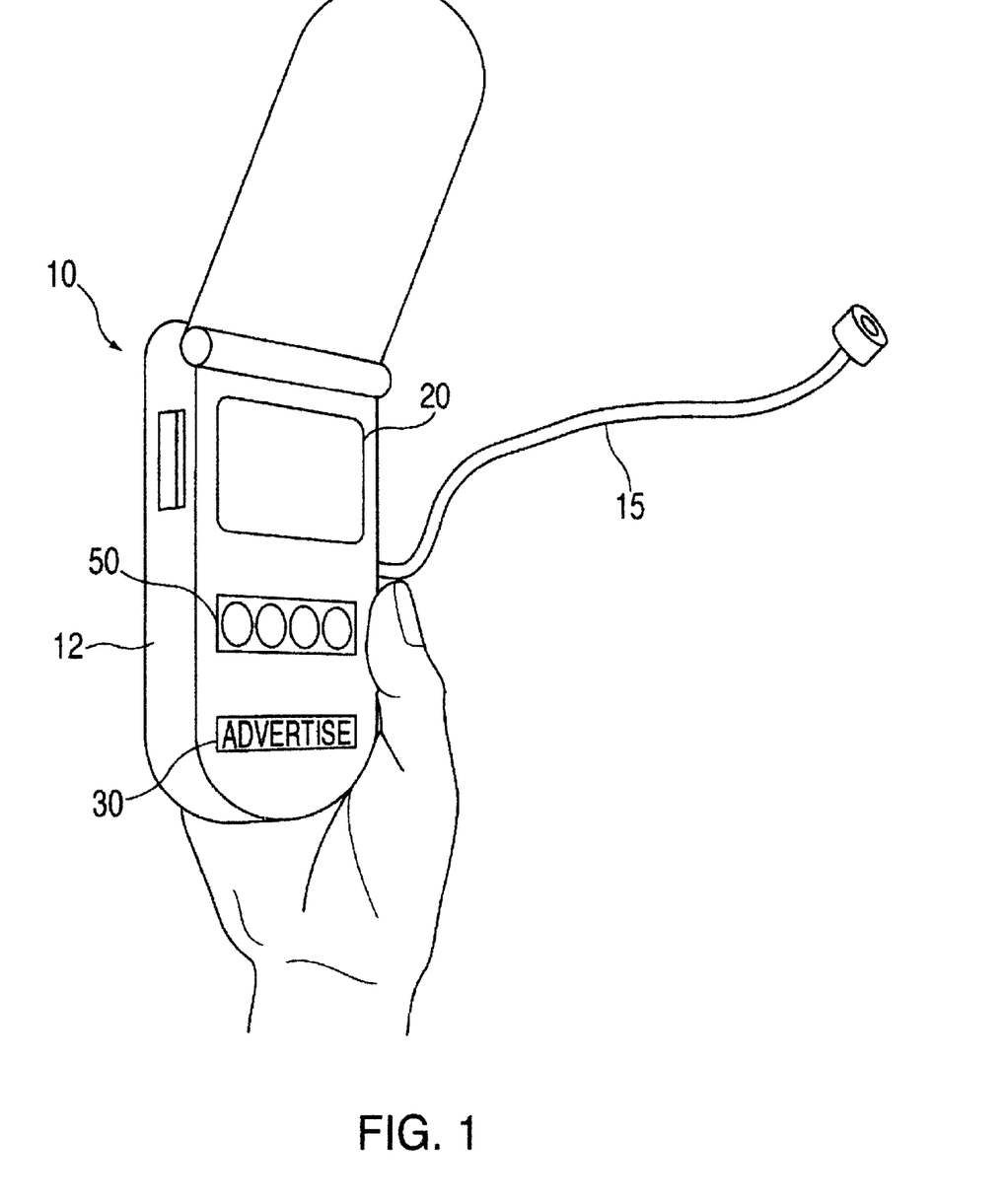
FIG. 1 is a perspective view of a hand held device used in connection with the interactive audience participation system of the present invention.
Figure 2:
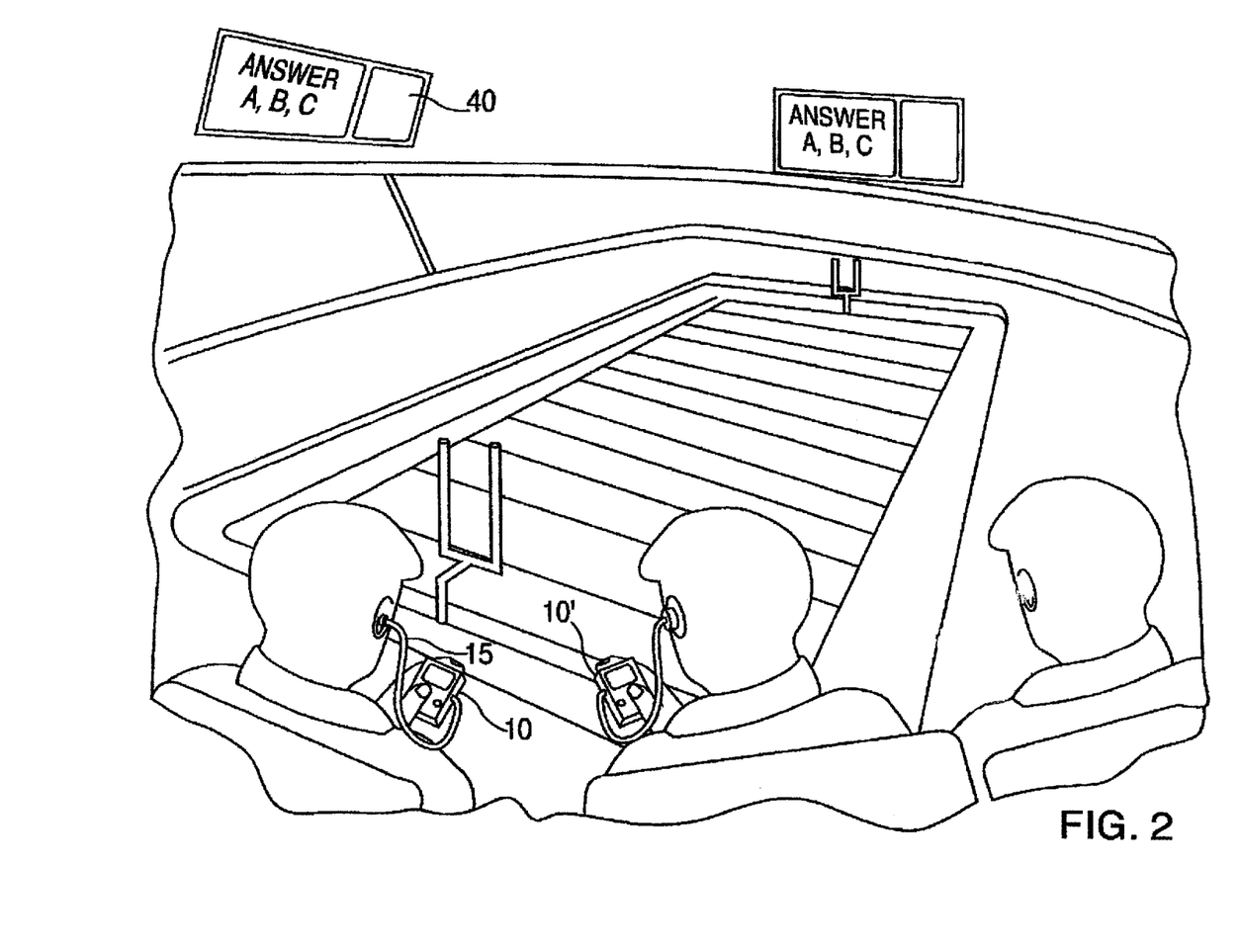
FIG. 2 is a schematic diagram of audience members at a spectator event utilizing the interactive audience participation system of the present invention.

Referring now to FIG. 1, there is shown one form of a hand held, interactive device 10 adapted for use in connection with the interactive audience participation system of the present invention. In one embodiment, device 10 is employed by audience members at a live event as shown in FIG. 2. The device is adapted to communicate bi-directionally with a wireless communications system operative at a live spectator event, to provide information to a user, and to accept entry of information through a user input interface for transmission to the wireless communications system. In a preferred embodiment the device 10 includes a housing 12 with an electronic display opening. An electronic display (visual display) 20 providing one form of user output interface is preferably mounted within the housing and is visible through the electronic display opening therein. The electronic display is in electrical communication with a local microprocessor mounted within the housing. A transceiver in electrical communication with the local microprocessor allows for the transmission and receipt of data from a wireless communications system connected to a central processor (not shown) in a manner known in the art. The electronic display is adapted to display data received from the local microprocessor. For example, the visual display is adapted to display messages that ask the audience member to answer a question or provide an opinion. It is contemplated that data in the form of audio messages could be sent to the user in lieu of or in addition to the visual display. Keypad 50 accepts user input for transmission to the central processor.

In another aspect of the invention, the interactive device is used by spectators to receive audible or video programming, which may be transmitted in the commercial AM or FM broadcast band or at any of a number of predetermined frequencies in the RF, VHF, UHF, or microwave frequency bands. Programming may also be transmitted optically, such as by modulation of an infrared emitting source located in the venue. Optionally, the device also comprises means for receiving and displaying video signals such as from ordinary broadcast television stations. Transmission of such program content may be done via conventional commercial broadcast stations or with low power transmitters intended only to cover the immediate venue. In a preferred embodiment device 10 incorporates circuitry to receive the aforementioned audio or video program content. The circuitry is adapted to receive the content and present it to the user. An earpiece 15 is preferably included to allow the user to listen to the radio associated with the device without annoying neighboring fans. It is noted that other listening means could be employed such as earphones, speakers, or the like. In other embodiments the aforesaid audio or video programming may be transmitted via any computer network to which the interactive device is connected, such as by streaming audio or video transmitted via the Internet, in accordance with presently employed protocols or other suitable protocols.

It is contemplated that special purpose devices such as the aforementioned interactive device 10 are optionally be available to those patrons who do not carry a conventional wireless device such as a cellular telephone or PDA. These special devices would preferably be prepared for each event at one or more central locations, having battery charging and menu programming capability, and transported to kiosks near patron entry points in the venue. The kiosks would each be either sales locations or rental contract stations to secure deposit and payment terms (cash, credit/debit card, etc.), and patron seat location information for rental of the special devices to patrons prior to start of the event, and collection of the special devices after conclusion of the event. Optionally, such a device is provided to at least selected audience members as part of the price of admission or, alternatively, as an optional item rented or purchased by the audience member, and subsidized by the promotional messages.

In another aspect of the invention, wireless devices such as those routinely possessed and used by members of the public, are used for the aforementioned interactive communication. Preferably the wireless devices are selected from the group consisting of wireless personal digital assistants (PDA) and Pocket PC's; two-way pagers; and cellular telephones. Such devices normally incorporate input means such as keypads, selection buttons, and touch screens, and video and audio output means such as display screens, speakers, and earphones. The devices typically include circuitry, such as a local microprocessor, adapted to convert wireless input into forms presented by the output means and to accept user-entered input that is converted for wireless output in a manner known in the art. Many of these devices are also Internet-enabled, that is to say, able to send and receive textual or graphic data in protocols which are commonly associated with Internet technology and able to be processed suitably by routers, servers, and other ancillary equipment used in Internet communication. Additionally, such devices frequently have the capability of sending and receiving electronic mail messages which may be transmitted worldwide over the Internet. Suitable PDA's include wireless units sold under the PALM™ tradename by Palm Computing and under the BLACKBERRY™ tradename by Research in Motion. Wireless Pocket PC's sold, e.g. by Hewlett Packard, Compaq, and Dell are also suitable.

As there are many suitable alternatives on which to base an embodiment of the current invention which are known to those skilled in the art, the specific interactive device and wireless communications technology used, the specific multiple access communication protocol used, and the specific client/server hardware interface and protocol are not important to the method of the invention so long as they support the required functions. What is important is the method of this invention by which the customer is provided better service.

A number of currently used communications protocols suitably provide connectivity between these devices and a wireless communications system. One presently preferred protocol is provided by the commercial cellular telephone network. Many telephones, currently operative with these networks incorporate provisions for sending and receiving textual messages and graphic images and for exchanging electronic mail through the Internet. For example, suitable techniques which may be used in the implementation of the present system are practiced in connection with cellular telephone systems, including such currently preferred methods as frequency division multiple access (FDMA), time division multiple access (TDMA), code division multiple access (CDMA), and global system for mobile communications (GSM) protocols. Current cellular telephone systems also provide various forms of instant messaging capability also useful in transmitting and receiving the queries, advertisements, and the like used in the present method.

Another preferred communications protocol is specified by IEEE Standard No. 802.11, published by the Institute of Electrical and Electronics Engineers, and incorporated herein in the entirety by reference thereto. IEEE 802.11 specifies a local area network system for wirelessly connecting individual devices such as PDA's and Pocket PC's to a local server through which the devices may communicate wirelessly, e.g. through a local intranet or the global Internet. Other wireless protocols that may be used to establish connectivity are also known, such as the Bluetooth Standard, published by the Bluetooth SIG and available through the website www.bluetooth.com, and incorporated herein in the entirety by reference thereto.

The bilateral wireless communications used in the practice of the present method and system are preferably implemented using at least one transmission form selected from the group consisting of radio transmissions, microwave transmissions, broadband wireless data transmissions, and satellite transmissions. Ultra-wide band and spread-spectrum transmission is an especially promising technology for the broadcasting of messages and transmission of spectators' responses. The multiplexing and frequency shifting inherently available in such technologies improve immunity to noise and interference and the security of data in transmission. For example, suitable techniques which may be used in the implementation of the present system are practiced in connection with cellular telephone systems, including such currently preferred methods as frequency division multiple access (FDMA), time division multiple access (TDMA), code division multiple access (CDMA), and global system for mobile communications (GSM) protocols.

It will be understood by one skilled in the relevant art that different transmission modes and frequencies may be used by the wireless communications system for the transmissions to and from the wireless interactive device and that multiple transmission modes and frequencies may be used to accommodate interactive devices of different types simultaneously operated in the present system.

One representative embodiment of the present invention is a method of enabling interactive participation by a plurality of spectators at a live event employing a wireless interactive device. The interactive participation enhances the enjoyment of such spectators at a live event transpiring at any form of entertainment venue.

The number of spectators constituting the plurality of spectator participants can vary depending on factors such as the size and nature of the live event, the prevalence of user-supplied wireless interactive devices, the availability of devices for sale or rent on-location, and the characteristics of the venue. At events with a very large number of spectators, e.g. the 50,000 to 100,000 or more fans that attend many major collegiate and professional sports games, a very small fraction of the participants suffices to provide statistically significant information characteristic of the entire crowd if the individuals are representative of the whole. For example, public opinion polls often rely on a sample as small as 500–1000 respondents to infer the views of the entire population of the United States. Accordingly, the term "plurality of spectators" as used herein, means a number of spectator participants varying from about 50 to as many as 100,000 or more. Preferably the number of spectator participants is at least about 1 percent of those persons present at the live event. Most preferably, the plurality of spectators ranges from about 25 percent to substantially all the spectator participants at the live event.

In a step of the method, there is provided a wireless communication system adapted to transmit and receive messages with the wireless interactive devices used by the spectators. The wireless system is used to disseminate promotional messages to the spectators through the user output interface of the wireless device.

The method also comprises querying the spectators to respond with answers entered through the user input interface of the wireless device and transmitted therefrom using the wireless communication system. The answers received are transferred to a central processor for processing into results. It will be recognized that the accumulation of results may be done in the central processor or in one or more distributed receiving servers networked in data communication with the central processor by techniques well known in the computer art, such as by use of a local area network communicating over wire, wireless, or fiber optic communication links. Preferably, a stored computer program operative in either form of server accumulates and stores the incoming answers, at least temporarily, as spectator data. The results of processing the spectator data are also preferably stored, at least temporarily. At a suitable time, such as after the expiration of an announced deadline for participants to enter and transmit their responses to queries, the processed results are then announced to the spectators. Optionally prizes are awarded to participants who have entered an answer.

Queries can be promulgated to the spectators in many ways, including notice given by public address system announcements, visual displays on scoreboards, video monitors, or the like visible to the spectators, or by messages such as aural, textual, or graphic messages transmitted to the interactive units and then output to the spectator using the user output interface. Optionally the queries are included in content provided by Internet portal sites to which the fans are connected. Questions may also be included in audio play-by-play descriptions or commentary broadcast to the interactive units. After assimilation and processing of spectator responses, announcement of results may be given to the spectators by similar means.

Displaying the results of the processing of the spectator data is a step that generally follows the processing of the spectator data. This provides feedback to the spectators, for example showing them how their answers compared to other spectators.

In one embodiment, a display visible to the spectators, such as large scoreboard or screen display 40, as depicted in FIG. 2 and remotely located from the fan (e.g., a JUMBOTRON® display), is used both for promulgating queries to participants and for announcing results. Alternatively, the display visible to the spectators comprises video monitors, preferably dispersed throughout the venue. The questions and results are optionally displayed on these monitors. A user input interface, such as keypad 50 on device 10, allows an audience member to enter a response to queries. Examples of simple user input interfaces include a keypad, selection buttons, a touch screen, a rotatable dial, a pointing device such as a mouse or trackball, and a voice recognition system, but any other user interface could be incorporated within the invention. A voice recognition system advantageously facilitates the use of the present system by visually impaired persons. Many easy to use interfaces are known to one of ordinary skill in the art, and the invention is not limited to any particular user interface.

In FIG. 2 there is depicted the practice of an embodiment of the invention. At least some of the spectators at an athletic event occurring in a large, outdoor stadium are provided with an interactive device 10 and 10'. It will be understood that the interactive device may be either an item such as a cellular phone, or a wireless PDA or Pocket PC provided by the spectator. Optionally, suitable devices are made available at the spectator venue for purchase or rent or are given away without charge. The present inventor contemplates that only a portion of the spectators in attendance at an event may choose to participate, either by using a suitable interactive device they furnish or by obtaining a unit at the venue. In other embodiments of the invention up to substantially all of the patrons at a live event participate by using the present method. FIG. 2 further depicts the users entering answers to a query using keypads available on their respective interactive devices and the display of answers on a large display board 40. In addition to displaying results of the audience querying or contest, the material displayed on board 40 or dispersed video monitors optionally also includes promotional messages or advertising. For example, a given contest question might be sponsored by a business entity in return for including advertising for the entity's products during the querying and announcing associated with that contest.

The offering of prizes to one or more selected spectators who have responded to the querying, participated in the interactive games, or answered correctly quiz questions may be utilized to enhance the enjoyment of spectators, to encourage further participation in the querying and contest aspects of the present method, and to promote the sale of goods and services. Such prizes include goods and services of any form or discounts toward the purchase thereof. Items may be delivered directly to a winning patron either at the live event location or another preselected location. Alternatively, coupons redeemable for items or services at no cost or at a reduced cost may be delivered to the winning patron in person; by mail or similar delivery service; or transmitted electronically as a message to the patron's wireless interactive device or as an entry in an account of the patron, such as a credit or debit card account, a wireless service provider account, or the like. In a preferred embodiment, credits or coupons are transmitted to the winning patron in conjunction with billings for such an account of the patron.

The types of questions appointed for audience response range widely. For example, at an athletic event such as a football game, the questions may relate to game strategy or to selection of a most valuable player. At a golf tournament, participants might be asked to indicate which club a player ought to select to accomplish a given shot. Concert goers might be asked to select a favorite song or artist from a number of choices presented. Other types of questions of more general nature and interest may also be used.

The responses of the audience members are sent to a central processor (not shown) having a computer program stored and operative therein that is adapted to tabulate the responses. Then, the processed information is stored and displayed to the audience member, either on the device 10 or a large screen display 40 remotely located from the fan. FIGS. 1 and 2. The processed information could be a compilation or tabulation of similar responses, as either a number or a percentage of total responses, a graphical representation in a bar chart, pie chart or the like, or a combined graphical and numerical representation of the data. The processing further may include categorization of participants' responses according to demographic characteristics, which might include the age or gender of the participant or his/her preferred team loyalty.

The wireless device employed in the present method preferably presents promotional messages from sponsors and/or advertisers. Monetary compensation for the presentation of such advertising material is optionally used to defray or underwrite the costs associated with practice of the present invention. Messages can be in the form of indicia 30 located (e.g., physically imprinted) on devices loaned, rented, or sold to spectators. Additionally, the messages can be visually displayed on the visual display of the device or can be aurally communicated through the same. The messages can be in the form of preprogrammed visual messages or recordings, but preferably are transmitted by the wireless communication system and presented live during the spectator event via open band lines. Visual advertising is optionally presented either in discrete segments or is incorporated into the overall image being presented at a given time, such as a banner ad.

In a further aspect of the invention, the interactive device is used to advertise goods and services for sale and to accept orders for same from the spectators. Advantageously, the interactive querying and contest aspects of the present method provide an impetus for users also to give attention to advertising that urges the purchase of goods and services. For example, such advertisements may interspersed with questions and contests, enhancing the likelihood that a patron will be motivated to make a purchase. In an embodiment, advertisements promoting the items are stored in a transaction server or recording system in data communication with the wireless communication system. Advertisements are selectively or generally transmitted by the wireless system for output by the user output interface of each interactive device. The user then enters an order for items or services desired using the user input interface, such as the keypad of a cellular telephone or PDA. The order is transmitted to the wireless communication system and routed to an order fulfillment server system. A computer program stored and operative therein receives the orders and communicates them to a provider of goods and services for order fulfillment. Physical goods, such as food and beverage, promotional items, and souvenirs may be delivered to the patron's seat, made available for pickup at a predetermined location at the entertainment venue, or shipped to another appointed location. In some embodiments, the wireless interactive device incorporates circuitry, such as global positioning sensor technology, whereby the device may be localized sufficiently to allow the provider to determine a patron's physical location and thereby effect direct delivery of items to the patron. Services or intangible items, such as tickets to future events or coupons redeemable for other items or for reduced prices, may be provided by similar forms of delivery or communicated electronically using known techniques. Preferably, monetary consideration for purchased goods or services is provided by electronic transfer of funds between bank accounts or by charges billed to a user, such as to a user's conventional debit or credit card or wireless service provider account. Consummation of transactions using other forms of payment known for electronic processing may also be used and are to be considered within the scope of the method of the invention. In one embodiment, the present system is connected to an electronic financial network of a type known in the art. Transfer of funds from the network provides monetary consideration to the provider for the goods and services received by the ordering spectator.

In one embodiment, a menu of items available for purchase is transmitted upon the user's request to the interactive device. A hierarchical arrangement of a known sort including submenus may be used in situations wherein more items are available than can be accommodated within the confines of output displays of extant interactive devices. Preferably the items offered include at least food, drink, souvenir merchandise, and tickets for future events. In addition, other services are optionally offered, such as restaurant, lodging and transportation reservations, biographical and recording data for athletes, concert artists, and other performers, future schedules of events, and myriad other information. This information can be conveyed visually, audibly, or via a combination of both media forms. The offerings presented through the wireless interactive device may be complemented by messages simultaneously displayed on scoreboards or the like to enhance their ability to garner the audience's attention.

In order to place an order, a user navigates using the input interface through the menus to select one or more items for purchase. The user may further enter location or other identifying indicia, such as a unique seat number or other reference number by which correct delivery may be effected. A credit card, bank account number, prepaid account number, or other similar reference by which money is electronically credited to the vendor in payment for the items ordered is also entered. Alternatively, any mechanism for effecting electronic payment known in the relevant art is used. As is well understood by those skilled in the art, even the limited hardware display and processing capacity of present cellular telephones, PDA's, and pagers is sufficient to accommodate the aforementioned menu and ordering method. However, as time moves on, much higher text densities, graphics, and even color will likely become commonplace in such devices and allow ever-increasing functionality to be provided and used in the method of this invention. As hierarchical menu systems have become ubiquitous with the advent of automated teller machines and windowed graphical user interfaces on modern computer operating systems, the concept and the method of its use are familiar to many persons and will not be further described here.

The use of electronic ordering and payment facilitates sales made in accordance with the present method. Items can be ordered by patrons from their seats at any time and timely delivered, without the need to wait for the unpredictable arrival of a roving vendor who may not even be carrying the item desired. The confusion of having to communicate an order in the often-noisy environment of a sports stadium is eliminated, as is the inconvenience of passing money in payment and change, possibly across many patrons between the customer and the closest aisleway. In addition to use of common credit and debit cards as means of payment, corporate accounts and billing through third party accounts such as the customer's Internet service provider or cellular telephone service provider are readily effected in a transaction processed in accordance with the present method.

In still another aspect of the present method, demographic information or characteristics of the users of wireless interactive devices are gathered and used in various ways. Users may be asked to enter information, such as their age or gender. Alternatively, such information may already be extant and available in databases, such as records of cellular telephone customers. Such information may be used to select which of a plurality of advertisements are most appropriate and likely to be of interest to a given user. The individual addressability of devices such as cellular telephones and wireless PDA's permits individually selected commercials to be presented to particular individuals or groups. Demographic information may also be used to tailor questions and limit contest participation to selected users. For example, participation in all or part of a survey or competition may be offered only to a restricted group, such as preferred corporate customers, patrons in selected classes of seats, season ticket holders, or youths. In addition, customer survey information is considered more useful by advertisers if the answers are categorized by the demographics of the respondents. All of these functions are easily implemented in the practice of the present method.

Figure 3:
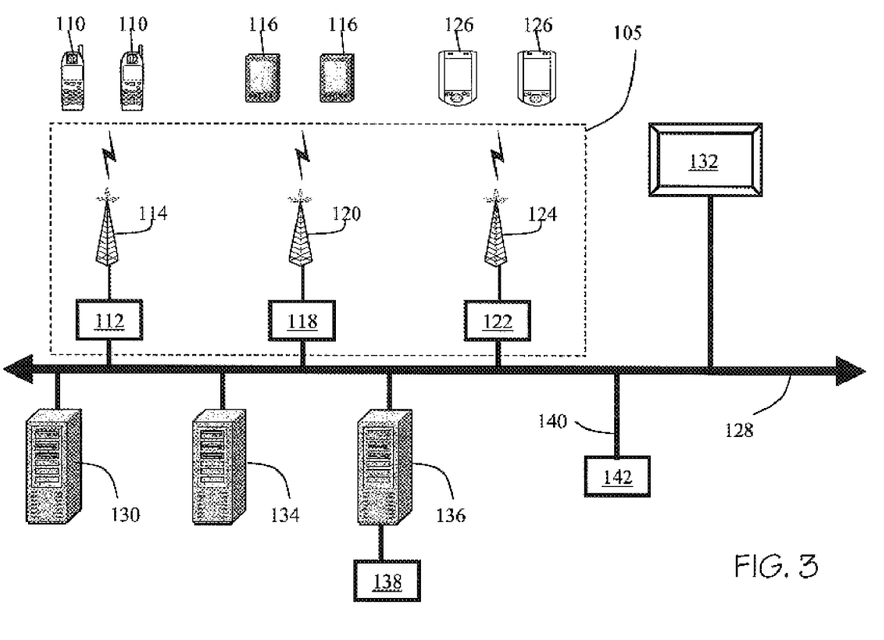
FIG. 3 is a schematic diagram of a system of the invention for enhancing spectator enjoyment and interaction.

FIG. 3 depicts one form of the system 100 of the invention. A wireless communications system 105 provides service to cellular telephones, wireless PDS's, and Pocket PC's. Wireless interactive devices used with the system are a plurality of cellular telephones 110 and served by cellular telephone provider 112 through signals transmitted and received at antenna 114. Wireless PDA's 116 are served by wireless PDA service provider 118 through signals transmitted and received at antenna 120. A wireless local area network 122 transmitting signals in accordance with IEEE Standard 802.11 from antenna 124 serves wireless Pocket PC's 126. Each of cellular telephone provider 112, wireless PDA service provider 118, and wireless local area network 122 communicates through the Internet 128. Promotional message server 130 selects promotional messages which are transmitted via the Internet to wireless communications system 105. and broadcast to interactive devices 110, 116, and 126. Promotional messages are also transmitted to stadium display 132. Central processor 134 provides queries displayed on display 132. Answers to such queries are entered on the user input interfaces of interactive devices 110, 116, and 126 and received by distributed receiving servers (not shown) maintained by each of cellular telephone provider 112, wireless PDA service provider 118, and wireless local area network 122. The distributed receiving servers accumulate the answers and transfer them by Internet to central processor 134 for processing into results, which are then communicated and displayed by display 132. Order processing server 136 receives orders for goods and services entered by spectators using their wireless interactive devices and communicates those orders to one or more providers 138 of goods and services, such as food/beverage vendors. Connection 140 to electronic financial network 142 enables the electronic transmission to providers 138 of monetary consideration for the goods and services they furnish. It will be understood by those skilled in the relevant art that the functions of the plural servers alternatively may be shared among a smaller number of servers or may be accomplished by central processor 134. The plural servers also may be in data communications via the Internet or a local network implemented using connections by wire, wireless, or optical data transmission, in any way conventional in the art.

In a further embodiment, the present invention is advantageously practiced in connection with the many sporting events that entail simultaneous activities in different locations comprised in a venue. For example, a golf tournament ordinarily comprises staged play, wherein the competing golfers begin play at individually appointed times over an extended period, so that play is occurring simultaneously at each hole through most of the duration of the event. Important tennis tournaments such as the U.S. Open or Wimbledon are ordinarily played in a venue comprising plural courts on which matches occur simultaneously. During the Winter and Summer Olympics, competition occurs simultaneously in many sports, sometimes in widely scattered locations. In each of these situations, the interactivity afforded by the present method provides a marked enhancement of the fan experience under such circumstances.

In still another aspect, the present system could be used to send messages to another fan, group of fans or all fans. This feature could be enabled in a manner similar to email by having a unique address programmed in each device.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for enabling interactive participation by a plurality of spectators attending a live spectator event within a venue, each participating spectator employing a wireless interactive device having capability (i) to receive and transmit messages, (ii) accept input via a user input interface, and (iii) output messages to a user output interface, the method comprising the steps of:

providing a wireless communication system adapted to transmit and receive messages with said interactive device;

disseminating at least one promotional message to said spectators through said user output interface of said interactive device;

querying said spectators to respond to at least one query with an answer entered through said user input interface and transmitted by said interactive device;

receiving answers entered by said spectators;

transferring said answers to a central processor;

processing said answers into results using said central processor; and announcing said results.

2. A method as recited by claim 1, further comprising the step of awarding a prize to at least one spectator who has entered an answer in response to said querying.

3. A method as recited by claim 1, further comprising the step of relaying informational items selected from the group consisting of news reports, traffic condition reports, weather conditions, weather forecasts, sports news and scores, said informational items being transmitted by said wireless communication system and output using said user output interface.

4. A method as recited by claim 1, wherein said promotional message solicits the purchase of goods or services by said spectator and said method further comprises accepting orders for said purchase entered using said user input interface, transmitted by said interactive device, and submitted to a vendor for fulfillment for monetary consideration.

5. A method as recited by claim 4, wherein said goods comprise at least one item of food, beverage, and promotional merchandise.

6. A method as recited by claim 4, wherein said services comprise admission tickets for a future live event.

7. A method as recited by claim 1, wherein said promotional message is disseminated for monetary consideration from an advertiser.

8. A method as recited by claim 1, wherein said interactive device transmits indicia identifying said device.

9. A method as recited by claim 1, further comprising collecting demographic characteristics of at least a portion of said spectators.

10. A method as recited by claim 1, wherein said promotional message is selected based on said demographic characteristics of said spectator.

11. A method as recited by claim 1, wherein said querying is limited to a portion of said spectators.

12. A method as recited by claim 1, wherein said wireless communications system transmits and receives using at least one transmission form selected from the group consisting of radio transmission, microwave transmission, broadband wireless data transmission, ultra-wide band transmission, spread-spectrum transmission, and satellite transmission.

13. A method as recited by claim 1, wherein said interactive device is a member selected from the group consisting of cellular telephones, two-way pagers, wireless personal digital assistants, and wireless pocket PC's.

14. A method as recited by claim 1, wherein said wireless interactive device is Internet-enabled and communicates therewith.

15. A method as recited by claim 1, wherein said user input interface comprises a plurality of keys.

16. A method as recited by claim 1, wherein said user input interface comprises at least one member selected from the group consisting of a keypad, selection buttons, a touch screen, a pointing device, a rotatable dial, and a voice recognition system.

17. A method as recited by claim 1, wherein said user output interface comprises at least one of an alphanumeric text display, a graphical display, and an audio output means.

18. A method as recited by claim 1, wherein said querying step is accomplished by at least one display visible to said spectators.

19. A method as recited by claim 1, wherein said querying step is accomplished by a notice audible to said spectators.

20. A method as recited by claim 1, wherein said querying step is accomplished by a message transmitted by said wireless communication system to said interactive device and output by said user output interface.

21. A method as recited by claim 1, wherein said announcing step is accomplished by a notice audible to said spectators.

22. A method as recited by claim 1, wherein said announcing step is accomplished by at least one display visible to said spectators.

23. A method as recited by claim 1, wherein said announcing step is accomplished by a message transmitted by said wireless communication system to said interactive devices and output by said user output interface.

24. A method as recited by claim 1, further comprising the offering of a special-purpose wireless interactive device for sale or rent.

25. A method as recited by claim 1, wherein said live spectator event comprises multiple activities occurring simultaneously in different locations within a venue.

26. A method as recited by claim 1, further comprising broadcasting informational items appointed for receipt by said wireless interactive device.

27. A method as recited by claim 4, wherein said interactive device further comprises localization circuitry and transmits its position obtained from said localization circuitry and indicia identifying said device and said position and indicia are used to effect delivery of goods to said spectator.

28. A method as recited by claim 2, wherein said prize is delivered to said spectator.

29. A method as recited by claim 2, wherein said prize is transferred electronically to said spectator.

30. A method as recited by claim 1, wherein said live spectator event is a sporting event.

31. A system for enabling interactive participation by a plurality of spectators attending a live spectator event at a venue, each participating spectator employing a wireless interactive device having capability (i) to receive and transmit messages, (ii) accept input via a user input interface, and (iii) output messages to a user output interface, the system comprising:
    a wireless communication system adapted to transmit and receive messages with said interactive device;
    means for disseminating least one promotional message to said spectators through said user output interface of said interactive device;
    means for querying said spectators to respond to at least one query with an answer entered through said user input interface and transmitted by said interactive device;
    a central processor adapted into process into results said answers entered by said spectators, received by said wireless communications system, and transferred to said central processor;
    means for announcing said results.

32. A system as recited by claim 31, wherein said disseminating means comprises a promotional message server in data communication with said wireless communications system, said promotional message server providing said at least one promotional message from plurality of messages stored in said promotional message server and sending said promotional message to said wireless interactive device through said wireless communications system.

33. A system as recited by claim 31, wherein said querying means comprises at least one display visible to said spectators.

34. A system as recited by claim 31, wherein said announcing means comprises at least one display visible to said spectators.

35. A system as recited by claim 31, further comprising at least one prize appointed to be awarded to at least one of said spectators.

36. A system as recited by claim 31, further comprising an order processing server in data communication with said wireless communications system, said order processing server receiving orders for goods and services entered by said spectators using said user input interface and communicating said orders to a provider of goods and services for order fulfillment.

37. A system as recited by claim 31, wherein said wireless interactive device is a member selected from the group consisting of cellular telephones, wireless personal digital assistants, wireless pocket PC's, and two-way pagers.

38. A system as recited by claim 31, wherein said wireless interactive device is Internet enabled and communicates therewith.

39. A system as recited by claim 31, wherein said wireless interactive device incorporates circuitry for receiving broadcast informational items and said system further comprises a broadcasting system broadcasting said informational items appointed to be received by said wireless interactive device.

40. A system as recited by claim 31, wherein said wireless communications system transmits and receives using at least one transmission form selected from the group consisting of radio transmission, microwave transmission, broadband wireless data transmission, ultra-wide band transmission, spread-spectrum transmission, and satellite transmission.

41. A system as recited by claim 31, wherein said user output interface bears at least one of said query directed to said spectators and said results.

42. A system as recited by claim 31, further comprising at least one distributed receiving server in data communication with said central processor and said wireless communications system, and wherein a computer program stored in said receiving server receives said answers and transfers said answers to said central processor.

43. A system as recited by claim 31, further comprising at least one visible display bearing at least one of said query directed to said spectators and said results.

44. A system as recited by claim 43, wherein said visible display comprises a plurality of video monitors dispersed throughout said venue.

45. A system as recited by claim 43, wherein said visible display comprises a scoreboard visible to the spectators in said venue.

46. A system as recited by claim 43, wherein said visible display comprises a large screen display visible to the spectators in said venue.

47. A system as recited by claim 31, wherein a computer program stored in said central processor is operative to process into results said answers entered by said spectators.

48. A system as recited by claim 32, wherein said promotional message server employs demographic characteristics of said spectators in selecting said promotional message.

49. A system as recited by claim 31, further comprising an order fulfillment server in data communication with said central processor, and wherein a computer program stored in said order fulfillment server receives orders for goods and services placed by said spectators and communicates said orders to a provider of said goods and services.

50. A system as recited by claim 49, further comprising a connection to an electronic financial network by which monetary consideration is received for said goods and services provided to said spectator by said provider.

51. A system as recited by claim 31, further comprising localization circuitry.

52. A system as recited by claim 31, wherein said live spectator event is a sporting event.

* * * * *